United States Patent
Pratt et al.

(10) Patent No.: US 6,799,562 B2
(45) Date of Patent: Oct. 5, 2004

(54) SYSTEM AND METHOD FOR BALANCING FUEL LEVELS IN MULTIPLE FUEL TANK VEHICLES

(75) Inventors: Howard L. Pratt, Wolcottville, IN (US); Robert H. Neely, Jr., Fort Wayne, IN (US); Richard L. Overman, Fort Wayne, IN (US); H. Edward Kelwaski, Craigville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 160 days.

(21) Appl. No.: 10/212,413

(22) Filed: Aug. 5, 2002

(65) Prior Publication Data

US 2004/0020474 A1 Feb. 5, 2004

(51) Int. Cl.[7] .............................................. F02M 37/04
(52) U.S. Cl. .................... 123/514; 137/255; 123/198 D
(58) Field of Search ............................ 123/510, 198 D, 123/509, 514; 137/255, 392, 565.22, 265, 574, 576, 563, 565.16, 571, 580; 417/40; 222/56; 180/314

(56) References Cited

U.S. PATENT DOCUMENTS

| | | | | |
|---|---|---|---|---|
| 3,724,481 A | * | 4/1973 | Schutzenauer | 137/101.25 |
| 4,683,864 A | * | 8/1987 | Bucci | 123/575 |
| 4,860,714 A | * | 8/1989 | Bucci | 123/514 |
| 4,930,537 A | | 6/1990 | Farmer | |
| 5,163,466 A | | 11/1992 | Moody | |
| 5,197,443 A | * | 3/1993 | Hodgkins | 123/514 |
| 5,331,994 A | * | 7/1994 | Bryan et al. | 137/1 |
| 5,360,034 A | * | 11/1994 | Der Manuelian | 137/571 |
| 5,555,873 A | | 9/1996 | Nolen | |
| 5,960,809 A | | 10/1999 | Keller | |
| 6,276,342 B1 | * | 8/2001 | Sinz et al. | 123/514 |
| 6,371,153 B1 | * | 4/2002 | Fischerkeller et al. | 137/265 |
| 6,494,226 B2 | * | 12/2002 | Tipton et al. | 137/1 |

* cited by examiner

*Primary Examiner*—Carl S. Miller
(74) *Attorney, Agent, or Firm*—Jeffrey P. Calfa; Dennis Kelly Sullivan; Susan L. Lukasik

(57) ABSTRACT

Each of two fuel tanks is disposed at a respective side of a chassis of a motor vehicle and has a respective sender for indicating the level of liquid fuel in the respective tank. A pump draws fuel from the tanks through a respective fuel draw conduit. Excess fuel is returned to each tank through a respective fuel return conduit. When the senders indicate an imbalance of fuel between the two tanks, a valve mechanism controlled by the senders disallows return fuel flow to the tank whose sender indicates that the level of fuel is greater than that indicated by the sender of the other tank by some defined amount while the pump continues to draw fuel from both tanks through the fuel draw conduits.

9 Claims, 2 Drawing Sheets

SYSTEM AND METHOD FOR BALANCING FUEL LEVELS IN MULTIPLE FUEL TANK VEHICLES

FIELD OF THE INVENTION

This invention relates to motor vehicles that have multiple fuel tanks for holding liquid fuel that is consumed by an engine to propel the vehicle. The invention is particularly concerned with a method and system for balancing fuel levels in the tanks by selectively returning return fuel from the engine to the tanks by using data from fuel level senders at the tanks to determine when, and to which tank, return fuel should be returned for correcting imbalance between tanks.

BACKGROUND OF THE INVENTION

Certain motor vehicles have multiple fuel tanks for holding liquid fuel that is consumed by an engine to power the vehicle. An example of such a vehicle is a medium or heavy truck that has a right fuel tank on the right side of the truck chassis and a left fuel tank on the left side. The engine is disposed more or less centrally of the chassis and forward of the fuel tanks. For any of various reasons, it may be considered desirable to maintain the respective fuel level in each tank more or less equal to that in the opposite tank, thereby achieving at least an approximate balance of fuel between the tanks.

Motor vehicle fuel systems having various means for drawing fuel from, and returning fuel to, multiple fuel tanks are disclosed in a number of U.S. patents. Examples of such fuel systems may be found in U.S. Pat. Nos. 4,930,537; 5,163,466; 5,555,873; and 5,960,809.

Those patents are concerned with switching a tank into and out of the fuel system, manually or automatically, and/or with correcting imbalance between tanks at opposite sides of the vehicle. None however is seen to provide dual-draw, dual-return operation when substantial balance exists between dual tanks while by providing dual-draw, single-return operation to correct indicated imbalance by disallowing return fuel to enter the tank indicated to have the greater level of fuel.

SUMMARY OF THE INVENTION

Two presently preferred embodiments of the invention are disclosed herein.

One embodiment employs two normally open solenoid valves, each selectively operable, by energizing its solenoid, to disallow return fuel flow to the respective tank when the respective tank has an indicated fuel level sufficiently greater than that of the other tank to indicate imbalance that needs correction.

Accordingly, one aspect of the present invention relates to a motor vehicle having a dual tank fuel system that provides dual-draw from, and dual-return to, the tanks as long as substantial fuel balance exists between them. When fuel imbalance is indicted, the system provides dual-draw, single-return by disallowing return fuel flow to the tank having a higher indicated fuel level.

The other embodiment employs a solenoid-operated diverter valve that selectively diverts the entire return fuel flow to one tank to the exclusion of the other tank. When the fuel level in that one tank becomes sufficiently greater than that in the other tank to indicate imbalance that needs correction, the diverter valve switches the entire return flow back to the other tank. Once the fuel level in the latter tank has risen to exceed that in the former tank by an amount indicating an imbalance that needs correction, the valve switches the entire return flow back to the former tank.

One generic aspect of the present invention relates to a motor vehicle comprising a fuel-consuming engine for powering the vehicle and a fuel system for fueling the engine. The fuel system comprises multiple fuel tanks, each for holding liquid fuel for the engine, and for each tank, a respective sender for providing data representing the level of liquid fuel in the respective tank. A pump draws fuel from the tanks through respective fuel draw conduits communicated to the respective tanks and delivers the drawn fuel to the engine. Excess fuel is returned from the engine to each tank through a respective fuel return conduit, with a valve mechanism controlling return fuel flow through the fuel return conduits to the tanks. A processor processes the data from the respective senders and causes the valve mechanism to disallow return fuel flow to a tank whose sender data indicates that the level of fuel is greater than that indicated by sender data from the sender of another tank by some defined amount.

Another generic aspect of the present invention relates to a method of balancing fuel tanks in a motor vehicle that comprises a fuel-consuming engine for propelling the vehicle and a fuel system for fueling the engine. The fuel system comprises multiple fuel tanks, each for holding liquid fuel for the engine, and for each tank, a respective sender for providing data representing the level of liquid fuel in the respective tank. A pump draws fuel from the tanks through respective fuel draw conduits communicated to the respective tanks and delivers the drawn fuel to the engine. Excess fuel is returned from the engine to each tank through a respective fuel return conduit, with a valve mechanism controlling return fuel flow through the fuel return conduits to the tanks. The method comprises processing the data from the respective senders, and causing the valve mechanism to disallow return fuel flow to a tank whose sender data indicates that the level of fuel is greater than that indicated by sender data from the sender of another tank by some defined amount.

Still another aspect relates to a motor vehicle comprising a fuel-consuming engine for powering the vehicle and a fuel system for fueling the engine, wherein the fuel system comprises two fuel tanks, each for holding liquid fuel for the engine, and each disposed at a respective side of a chassis of the vehicle. For each tank, a respective sender indicates the level of liquid fuel in the respective tank. A pump draws fuel from each tank through a respective fuel draw conduit and delivers the drawn fuel to the engine. Excess fuel is returned to the tanks through respective fuel return conduits. A valve mechanism controlled by the senders disallows return fuel flow to a tank whose sender indicates that the level of fuel is greater than that indicated by the sender of the other tank by some defined amount while the pump continues to draw fuel from both tanks through the fuel draw conduits.

Still another aspect relates to a fuel system of a motor vehicle that is powered by a fuel-consuming engine. The fuel system comprises two fuel tanks, each for holding liquid fuel for the engine, two senders, each for indicating the level of liquid fuel in the respective tank, and an engine-driven pump that is able to simultaneously draw fuel from both tanks and deliver the drawn fuel to the engine so long as the engine is running. The pump draws fuel out of the respective tank through a respective fuel draw conduit. Excess fuel returned from the engine enters a respective tank via a respective fuel return conduit. A valve mechanism controlled by the senders disallows return fuel flow to a tank whose sender indicates that the level of fuel is greater than that indicated by the sender of the other tank by some defined amount while the pump continues to draw fuel from both tanks through the fuel draw conduits.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
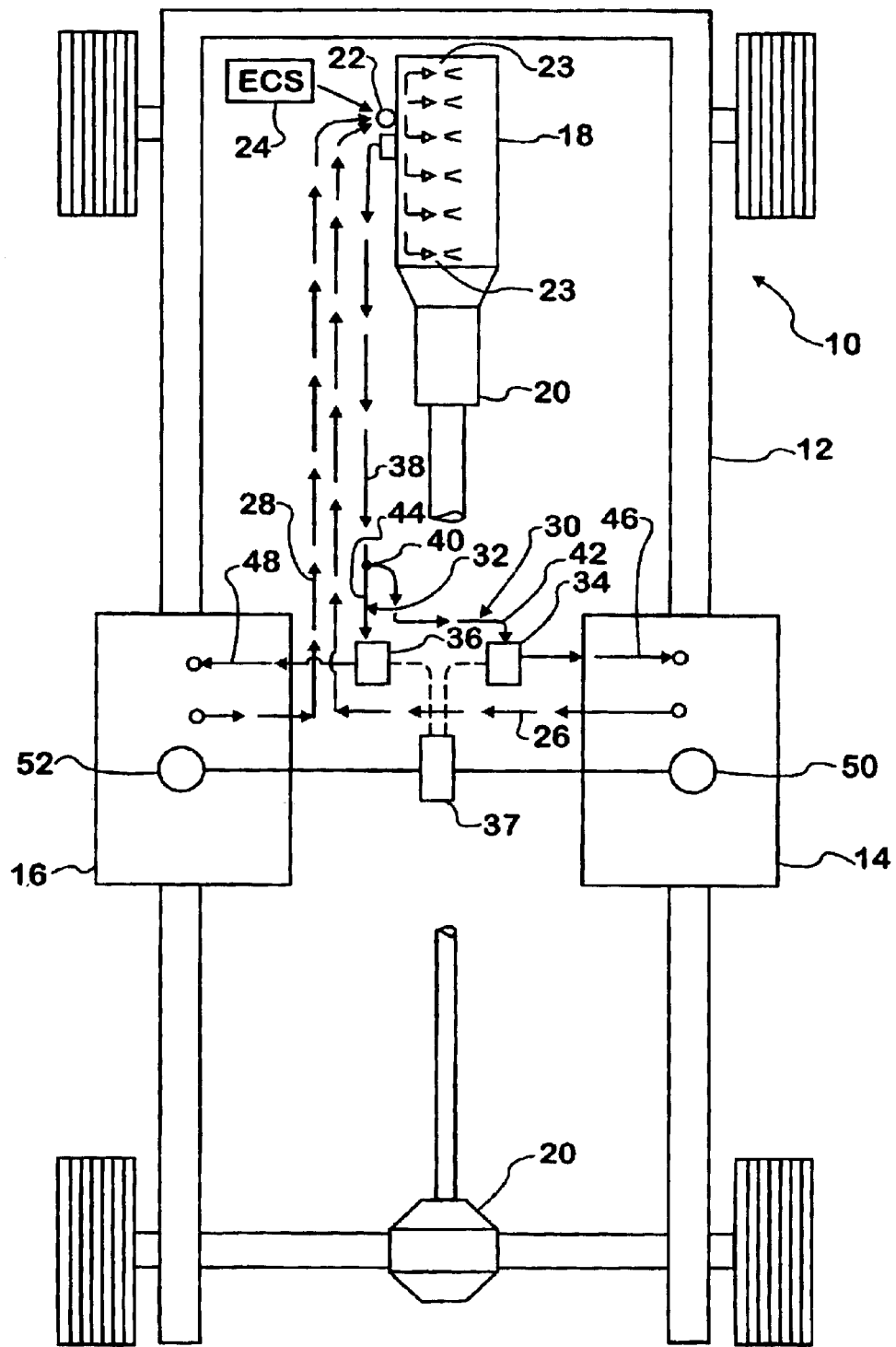
FIG. 1 is a general schematic diagram of a top plan view of a motor vehicle chassis with a dual fuel tank system in accordance with a first exemplary embodiment of the present invention.

FIG. 1 shows a wheeled motor vehicle 10 comprising a chassis 12 having a right fuel tank 14 on the right side of the chassis and a left fuel tank 16 on the left side. Each fuel tank 14, 16 is capable of holding a certain volume of liquid fuel and is mounted on a respective side rail of a frame of chassis 12. An engine 18 for propelling motor vehicle 10 through a drivetrain 20 is disposed more or less centrally of chassis 12 and forward of fuel tanks 14, 16. Vehicle 10 comprises a fuel system that in addition to fuel tanks 14, 16 comprises a fuel pump 22 for drawing liquid fuel from tanks 14, 16 and delivering the fuel to engine 18.

Engine 18 is an internal combustion engine, a diesel engine for example, that has a fuel injection system that receives the fuel pumped by pump 22 from tanks 14, 16. The fuel injection system comprises electric-actuated fuel injectors 23 mounted on engine 18 for injecting the received fuel into combustion chambers of the engine at times and in amounts determined by a processor-based engine control system (ECS) 24. For assuring that ample fuel is always available for fuel injectors 23, pump 22 draws an excess of fuel from tanks 14, 16, with the unused portion of the fuel being returned to the tanks as return fuel. Pump 22 is typically engine-driven.

A respective fuel draw conduit 26, 28 extends from a respective fuel tank 14, 16 to an inlet of pump 22. The portion of fuel not used by fuel injectors 23 is returned to a respective tank 14, 16 through a respective fuel return conduit 30, 32.

Return fuel flow through each return conduit 30, 32 to the respective tank 14, 16 is controlled by a respective electric-operated valve 34, 36. Each valve 34, 36 is under the control of any suitable controller, which could be engine control system 24, or alternatively as shown, a separate electrical control system 37 of the vehicle. Return fuel leaving engine 18 is conveyed through a single conduit section 38 that has a branch fitting 40 that branches the return fuel to conduit sections 42, 44, each of which extends to an inlet of a respective valve 34, 36. A respective conduit section 46, 48 conveys return fuel from an outlet of the respective valve to the respective tank.

Mounted on each tank 14, 16 is a respective fuel level sender 50, 52 for providing data representing the level of liquid fuel in the respective tank. While any suitable sender may be used, a typical sender is one that is float-operated to vary an electrical resistance of the sender in correlation with the level of liquid fuel in the tank. Each variable resistance is connected electrically to control system 37, thereby providing fuel level data for each tank to the system processor. To the extent that transient effects, such as fuel slosh for instance, may create excessive oscillations in the data, the data may be processed by any suitable low-pass filtering technique.

The control system processor acts to compare the respective fuel levels in the two tanks and to then operate valves 34, 36 in accordance with the result of the comparison to achieve some degree of balance between the amounts of fuel in the respective tanks. A suitable example for each valve 34, 36 is a normally open solenoid-operated valve. When such a valve is not energized, it is open, but when energized, it is closed.

In accordance with principles of the invention, whenever the tanks require balancing, the control system operates one valve 34, 36 closed, while leaving the other valve 34, 36 open. Which one of the two valves, 34, 36 is operated closed is determined by the result of comparing the fuel levels in the two tanks. When the result indicates that the fuel level in one tank is below that of the other by some predetermined amount, the valve leading to the other tank having the higher fuel level is operated closed, while the valve leading to the tank having the lower fuel level is not energized and therefore remains open. All the return fuel now enters that latter tank. While fuel can still be drawn from both tanks thereby maintaining the dual-draw, return fuel can now enter only that latter tank.

At some point, the fuel level in the tank that is receiving all the return fuel will rise to a fuel level that restores the balance, although the aggregate amount of fuel in both tanks may gradually diminish as the engine runs. Because the processor regularly processes the data from the two senders, it will become aware of that restoration, and when it does, it will deenergize the valve that had been closed so that return fuel can now pass to both tanks. Hence, it can be appreciated that the system functions to automatically restore balance between the two tanks whenever a certain amount of imbalance is detected. The two tanks may be considered balanced whenever the level of one is within a certain measure of the other. For avoiding undesired cycling of either valve, a certain amount of hysteresis may be programmed into the control system. The amount of hysteresis may even be large enough to cause the fuel level in the tank receiving all the return fuel to exceed that in the other tank before dual-return is restored.

The embodiment of FIG. 1 therefore provides both dual-draw and dual-return when the amounts of fuel in the two tanks are in substantial balance. It is only when an imbalance is detected that the system provides dual-draw, single return. Although the drawing shows each conduit 26, 28 running from the respective tank directly to the inlet of pump 22, the total amount of conduit length could be reduced by bringing each conduit to a fitting, such as a tee, and then running a single conduit from the fitting to the pump. This would still provide dual-draw from the tanks at all times. To the extent that some tank-to-tank siphoning could be possible when the engine is off and the vehicle parked on a non-horizontal surface when viewed from front or rear, any imbalance created by such a condition will be corrected when the engine is started.

Figure 2:
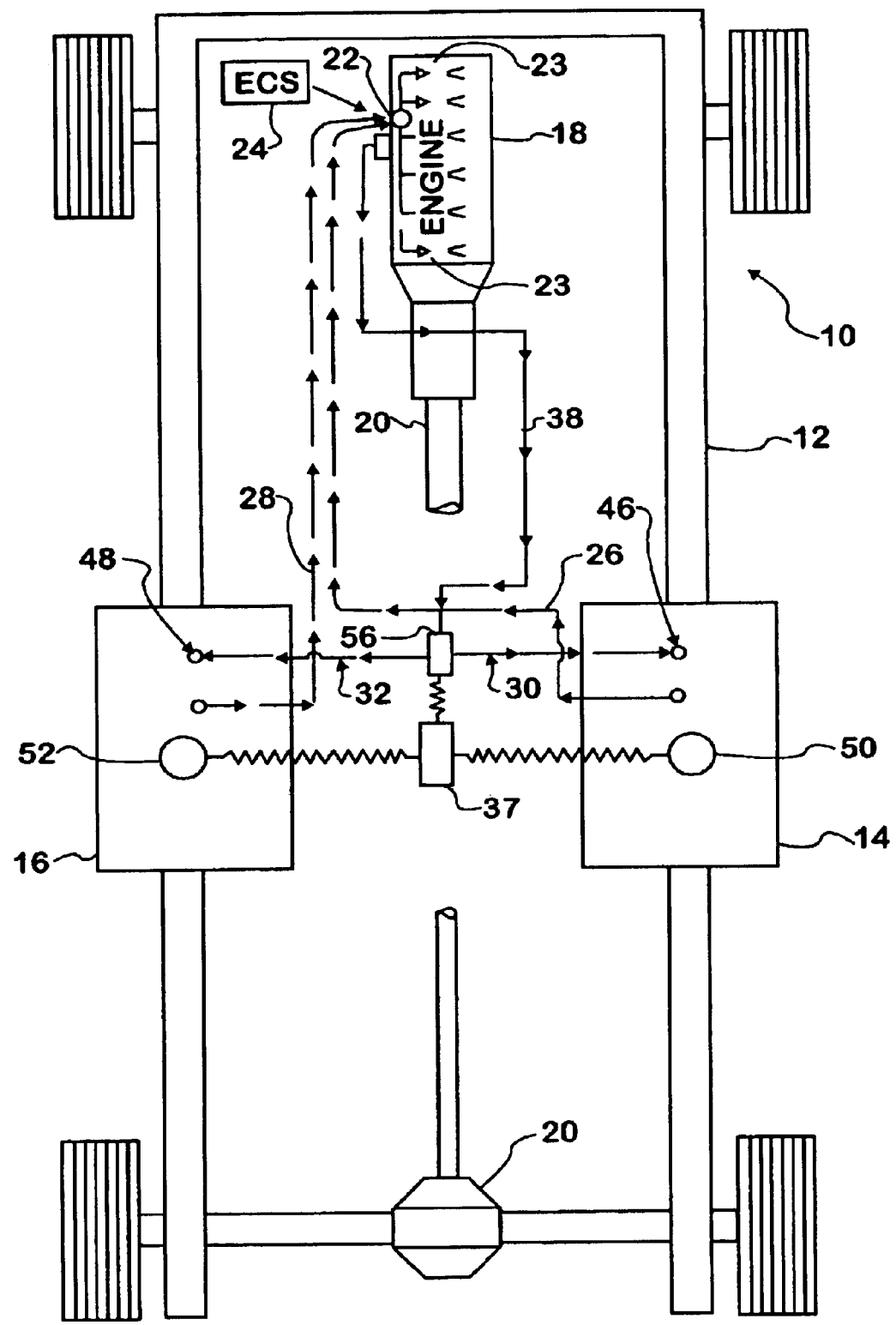
FIG. 2 is a general schematic diagram of a top plan view of a motor vehicle chassis with a dual fuel tank system in accordance with a second exemplary embodiment of the present invention.

The embodiment of FIG. 2 is similar to that of FIG. 1 in many respects, but differs in that it employs a single solenoid-operated valve 56 in place of branch fitting 40 and the two valves 34, 36. Single conduit section 38 extends from engine 18 directly to an inlet of valve 56. Conduit section 46 extends from one outlet of valve 56 to tank 14, and conduit section 48, from another outlet of valve 56 to tank 16. Each of the other reference numbers in FIG. 2 represents the same component as it did in FIG. 1.

Valve 56 is essentially a diverter valve. When valve 56 is not being energized, its inlet is open to one of its outlets, but not the other outlet; when the valve is not being energized, the inlet is open to the other outlet, but not the one outlet. Hence, at all times, the system provides dual-draw, single return.

Which one of the two valve outlets is open to the valve inlet is determined by the result of comparing the fuel levels in the two tanks. When the result indicates that the fuel level in a first one of the two tanks is below that of a second one of the two tanks by some predetermined amount indicative of imbalance, valve 56 is operated to divert the entire return fuel flow to the first fuel tank. While fuel can still be drawn from both tanks, return fuel can now enter only that first tank. Over time, the fuel balance between the two tanks will be gradually restored although the total amount of fuel in both tanks will gradually diminish as the engine continues running.

Balance is considered to have been restored when the difference between the fuel levels in the two tanks, as indicated by comparison of the data from the respective senders, has assumed a value indicating that the difference between fuel level in the first tank and that in the second tank has been reduced by some predetermined amount in comparison to the difference that had caused valve 56 to begin diverting fuel to the first tank. That predetermined amount introduces hysteresis that avoids frequent valve cycling. The amount of hysteresis may large enough to raise the fuel level in the first tank higher than that in the second tank before valve 56 operates to begin diverting fuel to the second tank. For example, the system could function to allow the fuel level in one tank to drop below that in the other by some amount, such as 10%, and then allow the level in that one tank to rise above that in the other by 10% before return fuel is diverted to the other tank.

Maintenance of reasonable balance of fuel between side-mounted fuel tanks is desirable for different reasons. Perhaps most importantly, it avoids running one tank dry as long as the total amount of fuel on-board is above some minimum. The invention accomplishes this without using a separate transfer pump. If the refueling of only one fuel tank creates imbalance, re-distribution of the added fuel will automatically commence upon operation of pump 22.

While a presently preferred embodiment of the invention has been illustrated and described, it should be appreciated that principles of the invention apply to all embodiments falling within the scope of the following claims.

What is claimed is:

1. A method of balancing fuel tanks in a motor vehicle that comprises:
   A) a fuel-consuming engine for propelling the vehicle; and
   B) a fuel system for fueling the engine, wherein the fuel system comprises:
   i) multiple fuel tanks, each for holding liquid fuel for the engine;
   ii) for each tank, a respective sender for providing data representing the level of liquid fuel in the respective tank;
   iii) a pump for drawing fuel from the tanks and delivering the drawn fuel to the engine;
   iv) for each tank, a respective fuel draw conduit through which the pump draws fuel from the respective tank;
   v) for each tank, a respective fuel return conduit through which excess fuel is returned from the engine to the respective tank; and
   vi) a valve mechanism for controlling flow of return fuel to the fuel return conduits;
   the method comprising:
   processing the data from the respective senders; and
   causing the valve mechanism to disallow return fuel flow to a tank whose sender data indicates that the level of fuel is greater than that indicated by sender data from the sender of another tank by some defined amount while the pumping apparatus continues to draw fuel from both tanks through the fuel draw conduits.

2. A motor vehicle comprising:
   A) a fuel-consuming engine for powering the vehicle; and
   B) a fuel system for fueling the engine, wherein the fuel system comprises:
   i) two fuel tanks, each for holding liquid fuel for the engine, and each disposed at a respective side of a chassis of the vehicle;
   ii) for each tank, a respective sender for indicating the level of liquid fuel in the respective tank;
   iii) pumping apparatus for drawing fuel from the tanks and delivering the drawn fuel to the engine;
   iv) for each tank, a respective fuel draw conduit through which the pumping apparatus draws fuel from the respective tank;
   v) for each tank, a respective fuel return conduit through which excess fuel is returned from the engine to the respective tank;
   vi) a valve mechanism controlled by the senders for disallowing return fuel flow to a tank whose sender indicates that the level of fuel is greater than that indicated by the sender of the other tank by some defined amount while the pumping apparatus continues to draw fuel from both tanks through the fuel draw conduits.

3. A motor vehicle as set forth in claim 2 in which the valve mechanism comprises a respective electric-operated valve for selectively allowing and disallowing return fuel flow through the respective fuel return conduit.

4. A motor vehicle as set forth in claim 3 in which each respective electric-operated valve comprises a normally open solenoid valve that when energized disallows return fuel flow through the respective fuel return conduit.

5. A motor vehicle as set forth in claim 2 in which the valve mechanism comprises an electric-operated diverter valve for selectively diverting the entire fuel flow to a selected one of the fuel return conduits.

6. A motor vehicle as set forth in claim 2 in which each sender comprises a fuel level sender that provides an electrical characteristic that varies with the level of fuel in the respective tank, and further including a processor that utilizes the electrical characteristic of the fuel level senders to control the valve mechanism.

7. A fuel system of a motor vehicle that is powered by a fuel-consuming engine, the fuel system comprising:
   A) two fuel tanks, each for holding liquid fuel for the engine;

B) two senders, each for indicating the level of liquid fuel in the respective tank;

C) an engine-driven fuel pump that is able to simultaneously draw fuel from both tanks and deliver the drawn fuel to the engine so long as the engine is running;

D) two fuel draw conduits through each of which the pump draws fuel out of the respective tank;

E) two fuel return conduits through each of which excess fuel returned from the engine enters a respective tank; and G) a valve mechanism controlled by the senders for disallowing return fuel flow to a tank whose sender indicates that the level of fuel is greater than that indicated by the sender of the other tank by some defined amount while the pump continues to draw fuel from both tanks through the fuel draw conduits.

8. A fuel system as set forth in claim 7 in which the valve mechanism comprises an electric-operated diverter valve that when energized, diverts the entire fuel flow to a selected one of the fuel return conduits to the exclusion of the other fuel return conduit, and when not energized, diverts the entire fuel flow to the other fuel return conduit to the exclusion of the one fuel return conduit.

9. A fuel system as set forth in claim 7 in which the valve mechanism comprises a respective electric-operated valve for selectively allowing and disallowing return fuel flow through the respective fuel return conduit.

* * * * *